Aug. 11, 1964  G. O. McCLENDON  3,143,810
TURNING RADIUS GAUGE
Filed Aug. 13, 1962
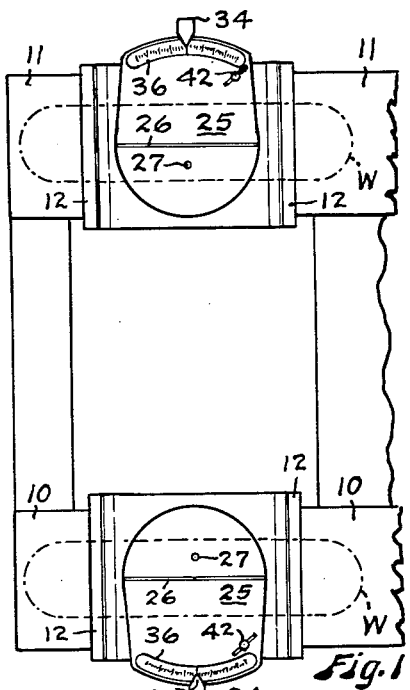
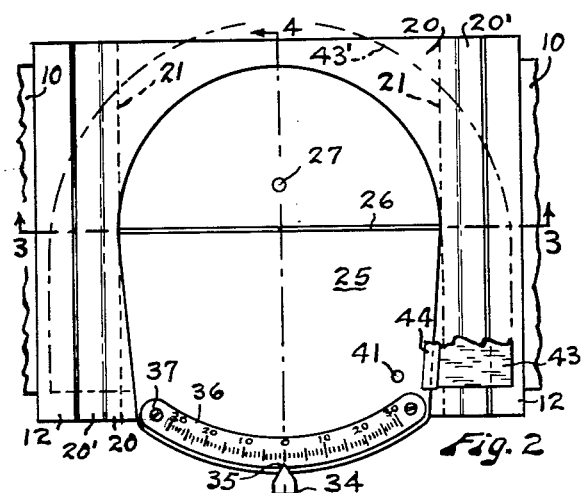
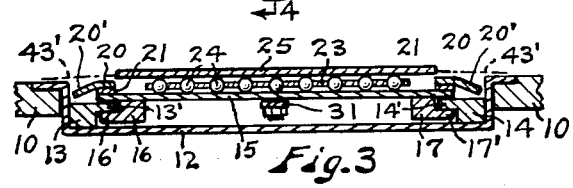
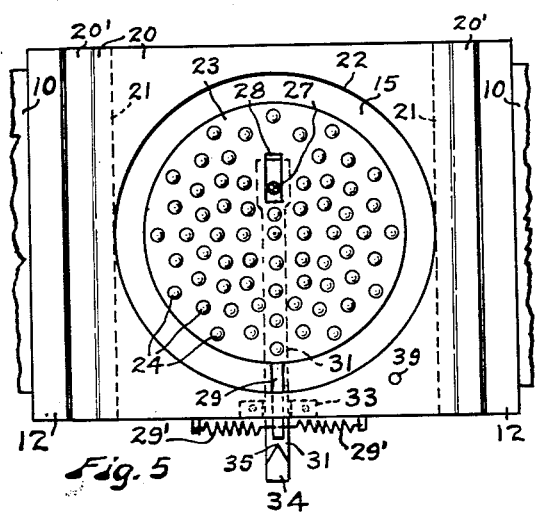
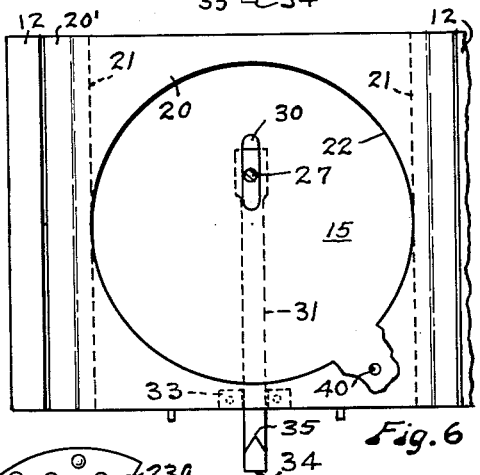
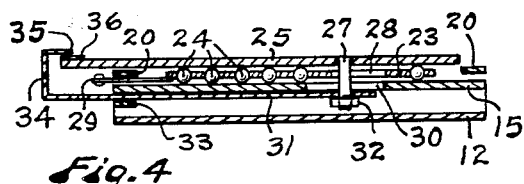
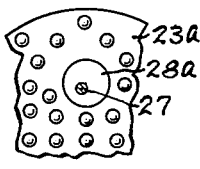
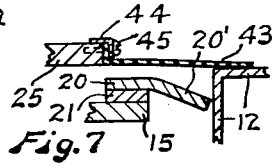
INVENTOR.
Gerald O. McClendon
BY
Fred C. Matheny
ATTORNEY United States Patent Office 3,143,810
Patented Aug. 11, 1964

3,143,810
TURNING RADIUS GAUGE
Gerald O. McClendon, 18810 10th Ave. NE.,
Seattle, Wash.
Filed Aug. 13, 1962, Ser. No. 216,624
3 Claims. (Cl. 33—203.12)

My invention relates to a turning radius gauge for use in testing the front wheels of vehicles for caster, camber, toe-in, toe-out, king pin inclination and the like.

A primary object of my invention is to provide turning radious gauge means of a type having wheel-supporting swing plates whereon the front wheels of a vehicle can rest and be supported and moved freely about their steering axes without tending to substantially change their position on the plates or run off of said plates.

Another object is to provide a turning radius gauge of this type in which the swing plate whereon the wheel to be tested rests is pivoted by an off-center stud pin positioned inwardly from the center of the plate and inwardly from the medial vertical plane of the wheel so that said off-center stud pin is substantially in line with the steering axis of the wheel which is being tested on the plate.

Another object is to provide a turning radius gauge having a freely movable wheel-supporting swing plate provided with a downwardly extending stud pin on which it pivots, said stud pin operating in two aligned slots, one in a ball retainer plate which is guided and positioned by the stud pin and the other in a fixed base plate which guides the stud pin and allows it to move in a predetermined direction, the stud pin being inwardly from the medial plane of a wheel which is properly positioned on the swing plate for testing.

Some turning radius gauges now in use are constructed and aranged so that the wheel to be tested is centered on a rotatively supported plate directly over a fixed vertical pivot member about which rotary movement of the plate takes place. If the wheel is thus centered directly over a fixed vertical pivot member about which the plate must turn the steering axis will be offset as respects the pivot and it is obvious that the wheel will move on the plate and tend to run off of the plate when said wheel is angularly moved about its steering axis. Some other gauges now in use allow a free floating movement, within predetermined limits, of the wheel supporting plate. With these gauges the wheel also tends to run off of the plate. My gauge overcomes these objections by providing a wheel-supporting swing plate having a vertical pivotal mounting member which is guided for lineal movement in a predetermined direction and is positioned so that it is approximately in line with the steering axis of the wheel which is being tested on the plate.

I have shown two of my turning radius gauges set up to take care of both front wheels of a vehicle. Usually these front wheels are tested one at a time. However, while one of said wheels is being tested it is necessary to have the other wheel supported so that it can swing freely about its steering axis and this is accomplished by providing the gauges in pairs.

In the drawings—

FIGURE 1 is a top plan view of a pair of turning radius gauges constructed in accordance with my invention showing fragments of a vehicle runway or support over which the front vehicle wheels can be moved onto and off of the gauges.

FIG. 2 is a top plan view, on a larger scale than FIG. 1, of one of said turning radius gauges.

FIG. 3 is a cross sectional view taken substantially on broken line 3—3 of FIG. 2.

FIG. 4 is a cross sectional view taken substantially on broken line 4—4 of FIG. 2.

FIG. 5 is a plan view similar to FIG. 2 but with the wheel-suporting swing plate removed to expose a ball retainer plate and balls wherein the swing plate is normally movably supported.

FIG. 6 is a plan view similar to FIG. 2 but with both the swing plate and ball retainer plate removed to show the base plate on which balls carried by the retainer plate normally rest.

FIG. 7 is an enlarged fragmentary sectional view showing a dirt excluding guard member carried by the swing plate.

FIG. 8 is a plan view showing a fragment of a ball retainer plate of modified form.

The two turning radius gauges shown in FIG. 1 are of duplicate construction but are reversed in position. The following description is applied to the gauge means shown lowermost in FIG. 1 but can be applied equally well to the gauge means shown uppermost in that figure.

In the drawings 10 and 11, FIG. 1, indicate horizontal supporting means in the form of runways or decking whereon motor vehicles having wheels to be tested may be supported and the wheels thereof moved onto and off of my gauges. 12 indicates a rectangular pan shaped support or drop pan carried by the deckings 10 and 11. The pan shaped support 12 herein disclosed is of conventional construction and is provided along opposite lateral edges with two parallel track members 13 and 14 which cooperate in mounting my radius gauge.

My gauge comprises a base plate 15 having rigidly attached track bars 16 and 17 and having flanges 16' and 17' on said track bars. The flanges 16' and 17' are respectively adapted to extend under and operatively engage with similar flanges 13' and 14' on the track bars 13 and 14. Thus the base plate 15 is supported for sliding adjustment within and by the pan shaped member 12 and can be manually adjusted to correctly position the gauge to receive a wheel.

A guard member 20 of rectangular outline is rigidly attached to and positioned above and supported on the base plate 15. Spacer strips 21 are interposed between the lateral edges of the base plate 15 and the guard member 20. The lateral edge portions 20' of the guard member 20 are preferably downwardly inclined, as best shown in FIG. 3. Said guard member 20 is formed with a relatively large circular central opening 22, best shown in FIGS. 5 and 6, and which provides ample clearance space for the reception of a movable ball retainer plate 23. A plurality of balls 24 are rotatively supported and positioned by the plate 23 and engage with and roll on the base plate 15.

A wheel-supporting plate 25, herein termed a swing plate, rests on and is movably supported by the balls 24. For the purpose of this description the portions of the swing plate 25 shown at the right and left in FIG. 2 are regarded as the lateral edges, the part thereon shown uppermost in the figure as the inner end and the part shown lowermost as the outer end. The swing plate 25 is positioned at a high enough elevation so it is above and clear of the adjacent edges of the pan shaped support 12. A wheel centering mark 26 is provided on the upper side of the swing plate 25 to indicate the proper initial centering position, on said plate 25, of the wheel to be tested and the outline of wheels correctly centered on the swing plates 25 are shown by dot and dash lines W in FIG. 1. A stud pin 27 is rigid with the swing plate 25 and extends downwardly therefrom and is offset, preferably about two and one eighth inches, from the centering mark 26, the direction of the offset of pin 27 being inwardly from the medial plane of a wheel W which is properly positioned on the mark 26 for testing. This positions the king pin or steering axis about which a wheel is moved in testing substantially coincident with the axis of the stud pin 27.

The stud pin 27 extends downwardly through a shorter radial slot 28 in the ball retainer plate 24 and a longer slot 30 in the base plate 15 and extends rotatively through an end portion of a pointer 31. The slot in the base plate is mid way between and parallel to the two lateral edges of said base plate. The lower end of the stud pin 27 is threaded and provided with a nut 32. Thus the pointer 31 is pivotally mounted on the stud pin 27 so that it moves with said pin 27 longitudinally of the slot 30 in the plate 15 but is not rotatively moved by said pin. The outer end portion of the pointer 31, shown at the left in FIG. 4, extends slidably through a guide member 33 which is rigid with base plate 15 and has an upwardly extending hook shaped part 34 which terminates in a pointed tip 35.

Both end portions of the swing plate 25 are shown rounded but their shapes and their distances from the pivot member 37 can be varied. A flat arcuate scale member 36 is secured to the outer end portion of the swing plate 25 and has graduations, preferably in degrees, marked thereon in both directions from a medially positioned zero point. These graduations are read relative to the tip 35 of the pointer 31.

A radially extending arm 29 is rigid with and protrudes outwardly from the periphery of the ball retainer plate 23. Preferably two balanced springs 29' are connected between the outer end portion of the arm 29 and fixed parts of the base plate 15 or guard member 20 so as to exert, on the arm 29, a balanced force which will tend to keep the ball retainer plate 24 in a correct and approximately centered position. If the springs 29' fail to correctly position the ball retainer plate 23 its position can be corrected by manually moving the adjusting arm 29. Because the balls 24 roll on both the base plate 15 and swing plate 25 it follows that movement of the ball retainer plate 23 will be only half that of the swing plate 25.

FIG. 8 shows a ball retainer plate 23a in which the slot 28 is replaced by an opening 28a of greater width than the pivot pin 27. This allows for some transverse floating movement of the plate 23a.

The guard member 20, FIG. 5, and base plate 15, FIG. 6, are provided with vertically aligned perforations 39 and 40 respectively. The swing plate 25, FIG. 2, has a perforation 41 adapted to register with the perforations 39 and 40 when said swing plate is properly positioned to receive a wheel. A locking pin 42, FIG. 1, which preferably is tapered to insure a snug fit, is provided for insertion into the perforations 41, 40 and 39 when said perforations are in registration to lock the swing plate 25 to the base plate 15 and guard member 20. The swing plate 25 will preferably be locked to the base plate 15 whenever a wheel is being moved onto or off of it and may be locked to the base plate at all times except during actual testing operations.

It has been found that the presence of dirt, sand and like foreign matter on the base plate 15 and in the compartment where the balls 24 operate will reduce the efficiency of this device substantially. To exclude such foreign matter I preferably cover at least a major portion of the opening between the margin of the swing plate 15 and the adjacent edges of the pan shaped support 12 with a pliable dirt excluding member 43 which can be formed of rubber or rubberized fabric. The member 43, see FIG. 7, is preferably secured to the marginal portion of the swing plate 25 by a binding member 44 of angle shaped cross section held in place by screws 45. The outer edge portion of the dirt excluding member 43 overhangs and rests upon the outer edge portions of the pan shaped support 12 and said dirt excluding member can extend entirely around the inner end of the swing plate 25. The dirt excluding member 43 is omitted in FIG. 1 and in FIG. 3 a fragment of said member 43 is shown by full lines and the marginal position of the remainder of said member 43 is indicated by dot and dash lines 43'.

In the operation of this turning radius gauge the two swing plates 25 shown in FIG. 1 are positioned, if necessary by adjusting one or both of them along the track members 13 and 14, so that the front vehicle wheels to be tested can be moved onto the plates 25 with the tires of both wheels centered on the marks 26. It will be understood that the swing plates 25 are preferably locked by the locking pins 42 in their proper initial positions before the wheels are moved onto them. In the initial positions of the swing plates the zero marks on the scale plates 36 coincide with the pointer tips 35. The swing plate locking pins 42 are then removed and steering movement is imparted to the wheels to swing them on their steering axes. The plates 25 move with the wheels and there is no slippage between said plates 25 and the tires. Also because the king pin or steering axes of the wheels approximately coincide with the axes of the pivotal stud pins 27 there is not much movement of the wheels on the swing plates 25 and the whels do not tend to run off of these plates.

The foregoing description and accompanying drawings clearly disclose a preferred embodiment of my invention but it will be understood that this disclosure is merely illustrative and that changes may be made within the scope of the following claims.

I claim:

1. A turning radius gauge for testing steering axis inclination of vehicle wheels comprising a fixed base plate having a slot of substantial length therein; a wheel-supporting swing plate positioned in spaced parallel relation above said base plate and having on its upper side a mark indicating correct positioning of a wheel thereon, said mark extending substantially at right angles to the direction of the slot in said base plate; balls movably supporting said swing plate from said base plate; retainer means positioning said balls; a downwardly extending pivot member rigid with and perpendicular to said swing plate and offset to one side of the wheel position defined by said mark on said swing plate, whereby when a wheel is correctly positioned on the swing plate the steering axis of the wheel will coincide substantially with the axis of said pivot member, said pivot member extending through the slot in said base plate compelling lineal movement of said swing plate in a direction lengthwise of said slot; and scale and indicator means capable of indicating the amount of angular movement of said swing plate.

2. A turning radius gauge for testing steering axis inclination of vehicle wheels comprising a fixed rectangular base plate having a slot of substantial length therein, said slot extending in a direction substantially parallel to the lateral edges of said base plate; a wheel-supporting swing plate positioned in spaced parallel relation above said base plate and having on its upper side means defining the position thereon of a wheel to be tested; balls between said base plate and said swing plate movably supporting said swing plate; a ball retainer plate positioning said balls relative to each other, said ball retainer plate having therein a slot in approximate registration with the slot in said base plate; a downwardly extending pivot member rigid with and perpendicular to said swing plate and offset to one side of the wheel position defined on said swing plate, whereby when the wheel to be tested is correctly positioned on the swing plate the steering axis of the wheel will coincide substantially with the axis of said pivot member, said pivot member extending through the slot in said ball retainer plate and the slot in said base plate guiding said ball retainer plate and providing lineal movement of said swing plate in a direction lengthwise of the slot in said base plate and providing rotary movement of said swing plate about the axis of said pivot member; a scale carried by the peripheral portion of said swing plate; and means fixed relative to said base plate defining a reference point from which said scale is read in determining the angular movement of said swing plate.

3. The apparatus as claimed in claim 2 in which the base plate is slidably mounted on a fixed support for lineal adjustment in a direction generally at right angles to the plane in which a wheel is initially positioned on the gauge for testing.

References Cited in the file of this patent

UNITED STATES PATENTS

| | | |
|---|---|---|
| 2,045,108 | Smith | June 23, 1936 |
| 2,124,902 | Bells | July 26, 1938 |
| 2,125,534 | Wochner | Aug. 2, 1938 |
| 2,155,541 | Graham et al. | Apr. 25, 1939 |
| 2,503,580 | Fontaine | Apr. 11, 1950 |